3,049,661
METHOD AND DEVICE FOR THE MEASUREMENT OF MAGNETIC FIELDS BY MAGNETIC RESONANCE
Anatole Abragam, Gif-sur-Yvette, Jean Combrisson, Montgeron, and Ionel Solomon, Chatillon-sous-Bagneux, France, assignors to Commissariat a l'Energie Atomique, Paris, France, a French state administration
Filed Apr. 1, 1958, Ser. No. 725,746
Claims priority, application France Apr. 6, 1957
22 Claims. (Cl. 324—.5)

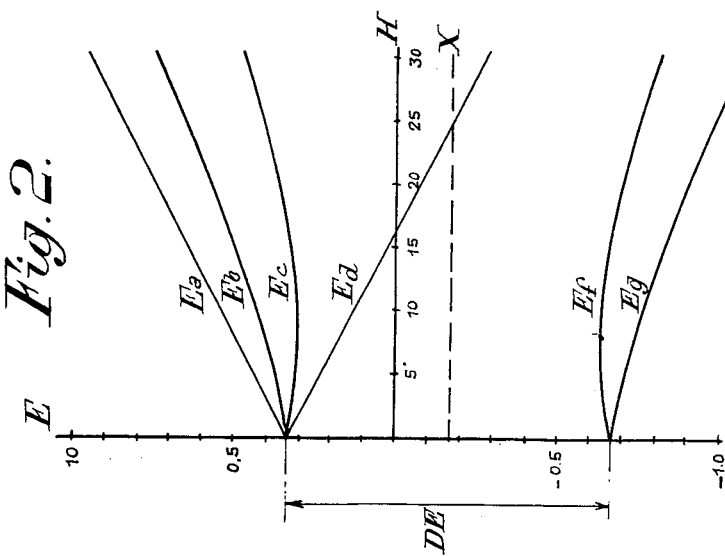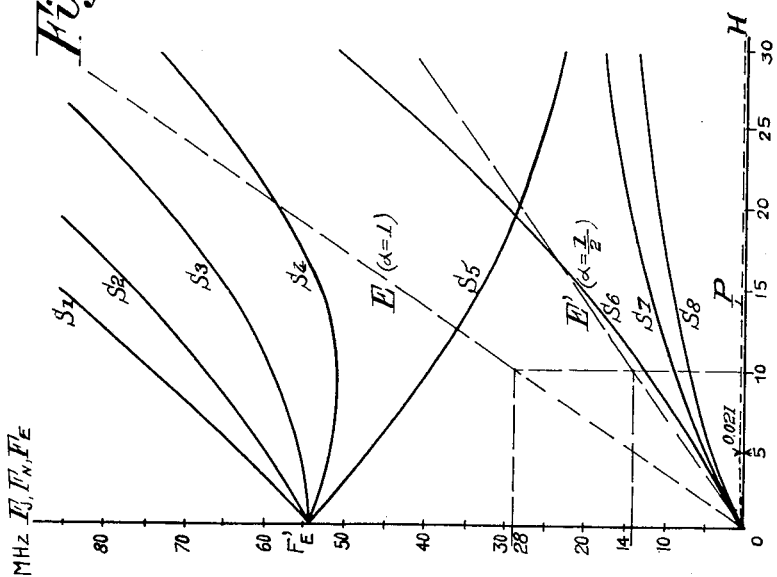

This invention relates to the measurement of magnetic fields, particularly of very small strength, e.g. of the earth's field, by magnetic resonance.

It is an object of the invention to provide a method and device for the quick and accurate measurement of magnetic fields, especially of weak or very weak magnetic fields.

It is another object of the invention to provide a method and device for measuring with a great relative precision the earth's magnetic field, especially in view of determining very accurately the local variations thereof.

It is also an object of the invention to provide a method and device for geophysical prospecting by determining the local variations of the magnetic field.

A further object of the invention is to provide means, light in weight and of rugged construction, permitting the correct and precise measurement of the earth's magnetic field, particularly from aboard a plane, especially for detecting valuable deposits.

It is still another object of the invention to provide a device generating directly oscillations of electromagnetic energy, the frequency of which is proportional to the magnetic field to be measured.

It is a further object of the invention to provide a rugged device of the above-mentioned type which includes a counter indicating directly the intensity of the local magnetic field with a very great precision.

It is also an object of the invention to provide a device giving directly the intensity of a weak magnetic field and which can be used by non-technical personnel.

In order to give a fair explanation of this invention, it seems necessary to acquaint the reader with the most important known facts about magnetic resonance and for this purpose we give first the following statement.

It is known that the atomic nuclei have a spin or intrinsic angular momentum $$\vec{R}$$

(corresponding to an internal mass rotation) and a magnetic moment $$\vec{\mu} = \gamma \vec{R}$$

(which shows that they act as if they were small magnets).

Therefore, when an atomic nucleus, having an angular momentum and a magnetic moment differing from zero, is placed in a uniform magnetic field $$\vec{H}$$

having a strength H, e.g. the earth's magnetic field, it wobbles or precesses, with a frequency F, often called Larmor frequency, given by the formula:

(1) $$F = \gamma \frac{H}{2\pi}$$

($\gamma$ being generally known as the gyromagnetic ratio).

Such a precession (which is similar to the precession of a gyroscope which is spinning rapidly around its axis in the gravitational field) is due to the action, on the angular momentum or nuclear spin $$\vec{R}$$

(resulting from a rotation of the nucleus around its own axis, which corresponds to the gyroscope rotation), of the torque resulting from the interaction between the nuclear magnetic moment $$\vec{M}$$

and the external magnetic field (said torque corresponding to the gravitational torque resulting from the interaction between the gyroscope weight and the gravity field).

Further, if an auxiliary alternating magnetic field $$\vec{H_1}$$

of frequency $f_1$, the magnitude $H_1$ of said auxiliary field being small in comparison with H, is applied along an axis perpendicular to magnetic field $$\vec{H}$$

an absorption of energy by the nuclei takes place, said absorption resulting from the change of a portion of the nuclei from the parallel to the anti-parallel position (relatively to field $\vec{H}$)

Such absorption is a function of $f_1$, H and $H_1$ and reaches its maximum value when frequency $f_1$ is equal to the Larmor frequency corresponding to field $$\vec{H}$$

i.e. when (1a) $$f_1 = \frac{\gamma H}{2\pi}$$

The nuclei are then subjected to a transition from one energetic state to another energetic state separated by an energy difference $\Delta E = h f_1$ ($h$ being Planck's quantum constant).

Of course it would also be possible in some cases (as will be explained hereinafter) to produce a stimulated emission of energy of the same frequency if it were possible to flip the $$\vec{\mu}$$

vectors from the anti-parallel to the parallel position.

Thus we see that, when the absorption detected e.g. in coils producing field $H_1$ is a maximum, the relation $$f_1 = \gamma \frac{H}{2\pi}$$

is verified (nuclear magnetic resonance condition), which allows the determination of H knowing $f_1$ and $\gamma$; as $\gamma$ is known for some nuclei with a precision within about 1/100,000 ($\gamma = 26,752 \pm 2$ sec.$^{-1}$ gauss$^{-1}$ for the proton or nucleus of hydrogen atom) and as the frequency $f_1$ can generally be measured with a similar precision, it seems theoretically possible to determine H with an absolute precision of about 1/50,000 and with a still better relative precision, as $\gamma$ does not vary between successive measurements.

It has been proposed, e.g. in U.S. Patent No. 2,561,489, issued on July 24, 1951, to Bloch and Hansen, now Re. 23,950, reissued Feb. 22, 1955, to use nuclear magnetic resonance in order either to measure a magnetic field, by placing atomic nuclei of known gyromagnetic ratio (e.g.

protons) in said field, or to perform a chemical nondestructive analysis, by placing, in a magnetic field of known magnitude H, a sample and determining the gyromagnetic ratios of the nuclei of said sample (the gyromagnetic ratios having different values for the various nuclei of non-zero angular momentum and magnetic moment).

In these known processes, and in particular in the process disclosed in the above-mentioned U.S. reissue, said nuclei of known or unknown gyromagnetic ratio $\gamma$ are placed simultaneously in a uniform magnetic field $$\vec{H}$$

having a known or unknown magnitude H respectively, sinusoidally modulated at low frequency with an amplitude which is a small fraction of H and in an alternating magnetic field $$\vec{H}_1$$

perpendicular to $$\vec{H}$$

obtained by means of a coil having the axis thereof perpendicular to $$\vec{H}$$

and which is traversed by a current of radio-frequency $f_1$, resonance being obtained when $$(1) \qquad f_1 = \gamma \frac{H + h'}{2\pi}$$

wherein $h'$ is the intensity of modulation of field H at the resonance.

The measure of H is therefore reduced to the determination of the resonance frequency which can be measured by known means with an accuracy above $1/1,000,000$.

But it must be considered that, when observing the nuclear resonance of nuclei having a non-zero spin quantum number, the thickness or breadth $\Delta H$ of the resonance lines or bands—which increases when the uniformity of field $$\vec{H}$$

(in the zone occupied by the sample containing said nuclei) and the mobility of said nuclei (which is much greater in the liquid state than in the solid state) diminish—and the signal to noise ratio, e.g. in a pick-up coil having the axis thereof perpendicular both to $$\vec{H} \text{ and } \vec{H}_1$$

and allowing to detect the resonance by picking up the resonance signal, limit the precision of the measure, for example of field H; in fact, it may be stated that the error $\partial H$ on the measure is given by the formula:

$$(2) \qquad \partial H = \frac{\Delta H}{\text{signal/noise}}$$

which shows that, in order to obtain a great precision i.e. a small $\partial H$, uniform magnetic fields, samples containing nuclei in a liquid (or eventually gaseous) state and strong signals should be used.

However the strength of the resonance signal rapidly decreases with the magnetic field, thereby limiting the application of nuclear magnetic resonance by the above-mentioned processes to fields which are substantially equal to or superior to 10 gausses (or oersteds).

More precisely, the resonance signal amplitude is proportional to:

$$(3) \qquad S = Qvn\gamma^3 H^2$$

wherein:

$Q$ = quality factor of the above mentioned pick-up coil A,
$v$ = volume of the sample,
$n$ = number of turns by centimeter of said pick-up coil.

In fact, calculation shows that, when taking into consideration the minimum possible value of the capacity of the tuned circuit used for detecting the resonance and including said pick-up coil, the optimum signal that can be practically detected is given by the formula:

$$(4) \qquad S_{opt} = Q\sqrt{v}\gamma^2 H$$

In order to obtain a resonance signal as strong as possible, it is therefore necessary to use atomic nuclei having a non-zero spin quantum number and the highest available gyromagnetic ratio. Among the atomic nuclei, it is the proton (the nucleus of the hydrogen atom) which has the highest gyromagnetic ratio ($\gamma = 26,752$).

It is however known that the electrons have a magnetic moment which is roughly 666 times higher than the magnetic moment of the proton, although they have the same spin quantum number (1/2). Therefore the electronic spins have a resonance frequency which is of the order of 28 mc./s. or MHz. in a field of 10 gausses, whereas in the same field, the proton spins have a resonance frequency equal to 42.6 kHz. according to the Formula 1, as for the electron $\gamma = 26,752 \times 666$.

Therefore, it seemed appealing to measure magnetic fields by determining the resonance frequency of electronic spins, but unfortunately, the electronic resonance band is, in the most favorable instances, much broader than a nuclear resonance line and therefore does not allow a precise determination of the magnetic fields, because in Formula 2 $\Delta H$ is large for electronic spins.

It is why it is necessary, in order to measure precisely magnetic fields, to use, e.g. according to the above-mentioned U.S. reissue, a nuclear resonance line, as the resonance line of hydrogen nuclei in water, said line being narrow or sharp and corresponding to one of the strongest signals of nuclear resonance in a given magnetic field. Said signal is however very weak in a weak or small magnetic field. For example, a specimen of 10 ml. of ordinary water does not give in a field of 10 gausses (frequency: 42.6 kHz.) any detectable signal in the pick-up coil.

In order to obviate the weakness of the nuclear resonance signal in weak magnetic fields, two modifications of this method have been used until now for measuring weak magnetic fields; these modifications are:

(a) The use of a very large sample of atomic nuclei with a detector having a very narrow band (lock-in type detector); such a process gave a signal which was 8 times stronger than the background noise with a sample of 2 liters of water placed in the earth's magnetic field;

(b) The previous polarization of the nuclear spins under test by a relatively strong field (e.g. a field of 100 gausses); the polarizing field is suddenly cancelled, the free precession of the spins in the earth's magnetic field is observed and the frequency of said precession is measured: the resonance signal thus obtained with a sample of 1 liter of water in the earth's magnetic field is sufficient, but the energy spent, especially in order to obtain the polarizing field, as well as the difficulty of cutting off suddenly said polarizing field render this method very difficult to use and demand a very important apparatus.

On the other hand, Overhauser has determined theoretically (Physical Review 91, p. 476, 1953, and 92, p. 411, 1953), that the saturation of the electronic resonance line of the conduction electrons in a metal should produce an increase of the nuclear polarization of the metal nucleus, by a factor which could be over 1000, by magnetic interaction of said nucleus with the conduction electrons.

Experiments performed by Carver and Slichter (Physical Review 102, pp. 975–980, 1956), have demonstrated the at least partial pertinency of Overhauser's predictions by observing, in fields over 10 gausses, the nuclear resonances of lithium 7, sodium 23 and the proton when saturating the conduction electron resonance of a metal or a metallic solution in liquid anhydrous ammonia.

It was also shown theoretically ("Overhauser Effect in Non-Metals," by A. Abragam, Physical Review 98, p. 1729, 1955, and "Relaxation Processes in a System of Two Spins," by I. Solomon, Physical Review 99, p. 559, 1955), that such increase of the nuclear polarization could also take place in some paramagnetic solutions.

For example, a specimen of a few cubic centimeters of water (or of any other liquid, as benzene, producing a narrow nuclear resonance line), in which paramagnetic impurities were previously dissolved ("doped" water), was used so that the major proton relaxation mechanism was the interaction between the proton spins and the electronic spins of the dissolved paramagnetic impurities.

Under these conditions, if the electronic resonance line is saturated by applying, at right angles with the field being measured, a strong radio-frequency field at the electronic resonance frequency $F_E$, the polarization of the nuclear spins (protons in the case of water) increases in the ratio:

$$(5) \qquad \rho = \alpha \frac{F_E}{F_N}$$

wherein: $F_N$ is the nuclear resonance frequency in the magnetic field being measured, $F_E$ is the electronic resonance frequency in said field and $\alpha$ is a coefficient, depending on the detailed relaxation mechanism and on the saturation degree of the electronic resonance, which is inferior to or, at most, equal to 1.

If the electronic line is simple (no hyperfine structure), the ratio $\rho$ is independent of the field to be measured and has a value $$(6) \qquad \rho_0 = 666\alpha$$

for the protons.

It is therefore possible to obtain a rather important increase of the signal for a typical value of $\alpha$ ($\alpha = 0.5$ for a dipole-dipole interaction and a complete saturation).

In the Overhauser effect limited to metals or extended to paramagnetic substances having no hyperfine structure, an energy exchange takes place between the electronic and nuclear spins and the "atomic lattice" (said "atomic lattice" being the remainder of the atomic system wherein the nuclei are placed), the maximum nuclear polarization which can be obtained by saturating the electronic resonance band by an alternating electromagnetic field depending upon the type of interaction between electronic and nuclear spins and upon the mechanism whereby the lattice provides the energy for the relaxation. This polarization produces an increase of the amplitude of the nuclear magnetic resonance signal (the increase over the unpolarized proton resonance signal being not superior to 666) which is observed for the resonance frequency $F_N$, this enhanced resonance amplitude being caused by a polarization alternating field at the frequency $F_E$.

Under these conditions, it is possible to saturate the electronic resonance band, which is rather broad, at a frequency $F_E$, which may be for example in the microwave band for a field H of about 10 to 10,000 gausses and the resonance is observed at a much inferior frequency, e.g. a radio-frequency corresponding to the narrow or sharp nuclear resonance line $F_N$. Such an experimental process of verification of Overhauser's effect is described in the above-mentioned article of Carver and Slichter.

Of course, $$F_N = \gamma_N \cdot \frac{H}{2\pi}$$

and $$F_E = \gamma_E \cdot \frac{H}{2\pi}$$

wherein $\gamma_N$ and $\gamma_E$ are the gyromagnetic ratios of the nucleus and of the electron respectively. If $\gamma_P$ is the gyromagnetic ratio of the proton, $\gamma_E = 666\gamma_P$, this relation limiting the resonance signal amplitude increase due to the polarization which may be obtained by such a process with the proton.

In FIGURE 1 of the appended drawings, the resonance frequencies (in MHz.) were plotted against the fields H (in gauss) and two straight lines P and E, having respectively the slopes $$\frac{\gamma_P}{2\pi}$$

and $$\frac{\gamma_E}{2\pi}$$

represent Formula 1 for the proton and the electron respectively: the straight line P is practically identical with the abscissae axis at the scale of FIG. 1 as $$\frac{\gamma_P}{\gamma_E} = \frac{1}{666}$$

These straight lines P and E represent also, with another scale for the ordinates, the variation of the energy $\Delta E$ emitted or absorbed by the turning over of the protonic and electronic spins, at the resonance (because $\Delta E$ is proportional to the resonance frequency) and consequently, with still another scale for the ordinates, the amplitude of the resonance signal.

It is seen on said FIGURE 1 that, although multiplied by a factor 666 when passing from the proton to the electron (or by a factor which may be superior to 1000 when passing from a nucleus having a smaller $\gamma$ than the proton, to the electron), the resonance signal amplitude is small in weak fields as the earth's magnetic field (about 0.5 gauss). For $H = 1$ gauss, the maximum resonance frequency $$F_E = \frac{\gamma_E}{2\pi}$$

and $$\Delta_E = hF_E = \frac{h}{2\pi}\gamma_E = 1.85 \times 10^{-20} \text{ ergs}$$

for each electron; the resonance signal is practically undetectable except with a very large specimen of protons.

We have surprisingly discovered that it was possible to still increase the nuclear polarization and accordingly the resonance signal amplitude particularly in weak magnetic fields as the earth's field by dissolving, in a liquid sample containing atomic nuclei of non-zero angular momentum and magnetic moment, a paramagnetic substance of a particular type containing at least one electronic resonance line or band presenting a hyperfine structure resulting from an interaction between an electron and a nucleus both belonging to said substance; in such cases there exists an interaction between a nucleus and an electron sensibly stationary relative to said nucleus, i.e. a true hyperfine structure, which may be called a bound or stationary hyperfine structure as opposed to the structure, sometimes also called hyperfine structure, considered in the Overhauser's effect, wherein a conduction electron or an electron from a paramagnetic substance (generalized Overhauser's effect) interacts with a nucleus relative to which it is free to occupy several positions, only the mean position having an influence.

The substances which are capable of supplying such an increase of the polarization by bound or stationary hyperfine structure interaction are generally free radicals or ions (the nucleus thereof being advantageously a nitrogen nucleus) and they contain at least one electron having magnetic moments combined so as to form a non-zero total electronic magnetic moment, said electron being bound to the molecule and the life time of said substances in active state being sufficient for allowing the saturation of their electronic band or bands of stationary hyperfine structure.

The dissolved paramagnetic impurity may be advantageously constituted for example by ions of nitrosodisulfonate $[(SO_3)_2NO]^{--}$ (also called peroxylamine disulfonate) or of diphenylpicryl-hydrazil; the quantity of said impurity to be dissolved in the sample is not at all critical.

We have also discovered that, when such substances are dissolved e.g. in water (a compound which contains protons), the curves obtained, when plotting the variations of the electronic resonance frequency against the uniform magnetic field H (FIG. 1) instead of being straight lines starting from the zero point as for electronic resonances of the Overhauser's type (curve E) or for the nuclear resonances (curve P), are curves, as curves $S_1$ to $S_8$ (shown on FIG. 1), some of which start from a point $F'_E$ having for a zero abscissa an ordinate which is different from zero, the electronic resonance frequency $F_s$ (which has $F'_E$ as a limit when the strength of the magnetic field decreases towards zero) of the paramagnetic impurity of the abovementioned special type being different from that given by the Formula 1

$$F = \gamma \frac{H}{2\pi}$$

whereas, of course, the nuclear resonance frequency $F_N$ which permits the measure of the magnetic field H, is given by said formula. The curves $S_1$ to $S_8$ represented in FIG. 1 correspond to the nitrosodisulfonate; some of these curves, i.e. curves $S_1$, $S_2$, $S_3$, $S_4$ and $S_5$ start from the point $F'_E$ (limit of $F_s$ for a zero field) having an ordinate of about 55 mHz., whereas the other curves $S_6$, $S_7$ and $S_8$ start from the zero point.

It should be considered that curves $S_1$ to $S_8$ are substituted for straight lines E and P which disappear due to the stationary or true hyperfine structure, whereas straight line E (or a straight line E' having a similar slope in order to take account of coefficient $\alpha$ in Formula 5) exists in case of a free Overhauser interaction due to the electron mobility in this last case.

It should also be considered that curves $S_6$ to $S_8$ are less interesting than straight line E when measuring weak or very weak magnetic fields, whereas curves $S_1$ to $S_5$ are much more advantageous for such fields, as the ratio between the electronic resonance frequency $F_s$ of a paramagnetic substance having a stationary hyperfine structure and the theoretical maximum resonance frequency of a substance (as a metal) with "free" electrons, in a field of 0.5 gauss (the earth's field), is about 40, as calculated hereinunder, and as the amplitudes of the nuclear resonance signals to be detected are in the same ratio.

The process according to the invention consists therefore in dissolving in a liquid containing nuclei or spins, e.g. protons, a paramagnetic substance of the free radical or ionic type presenting at least one saturable electronic magnetic resonance line or band presenting a stationary hyperfine structure—i.e. including in its structure at least one electron of total electronic magnetic moment different from zero in stationary interaction with at least one nucleus—the electronic resonance frequency of said line having an important value, e.g. superior to 1 MHz. in the absence of magnetic field, in disposing said sample in the magnetic field to be measured, in saturating said band at said frequency and in determining the nuclear resonance frequency of said first-mentioned nuclei or spins.

Among the paramagnetic substances which may be used in embodying the invention, the preferred substances are listed hereinunder, without said list being in any way limitative of the invention:

Potassium or sodium nitrosodisulfonate, dissolved in water, pyridine or formamide;
Diphenyl-picryl-hydrazyl, dissolved in benzene or other organic products;
Tetraphenylstibonium nitrosodisulfonate, dissolved in ether;
Picryl-aminocarbazyl dissolved in benzene;

Semiquinone ions, e.g. $(O=C_6H_4-O)^-$ ions, dissolved in water.

The use of a dissolved impurity presenting an electronic resonance line with a bound hyperfine structure allows, according to the invention, to perform the saturation of a resonance line of the electronic spins at a resonance frequency much higher (e.g. 40 times higher as indicated hereinabove) than in the absence of such hyperfine structure; on the other hand, the measure of the magnetic field is made by determining the nuclear resonance, which allows a great precision due to the fact that the line of nuclear resonance is very sharp.

It should also be noted that until now, e.g. as disclosed in the above-mentioned Re. 23,950, it was necessary to provide either a frequency sweep or a field sweep in order to obtain the resonance, i.e. in order to determine the center of the resonance band or line. Such a procedure included many drawbacks, especially:

The need of a generator of very stable frequency;
The production of a sweep;
The possible perturbation, by the sweep, of the field to be measured;
The introduction of an error due to the difficulty in estimating very precisely the center of the resonance line or band.

But we have observed that, even in the conventional Overhauser effect (i.e. when applied to metals) and also in the Overhauser effect extended to ordinary paramagnetic substances (i.e. to paramagnetic substances without true hyperfine structure), the signal was not only increased by a factor which is often large, but that this increase of the signal could, under certain conditions on the sign of the nuclear moment, take place with the stimulated emission of energy by the nuclear spins instead of energy absorption as it happens when one realizes the resonance by energy absorption by nuclear spins. Such energy emission is still more important in the case of paramagnetic substances with true or bound hyperfine structure of the above-mentioned type.

The device according to the invention is precisely based on such energy emission by a system of nuclear spins submitted to the Overhauser effect or preferably to the effect resulting from the introduction of paramagnetic substances having a stationary hyperfine structure.

In fact, a sample containing such nuclear spins and paramagnetic substance disposed in a magnetic field emits, when an electronic resonance line of said paramagnetic substance is saturated, a signal having a frequency which is perfectly proportional to the magnitude of said magnetic field, the measure of said field being accordingly reduced to the precise measure of said frequency. We have in fact made the surprising discovery that when a sample containing nuclear spins (i.e. atomic nuclei of non-zero angular momentum and magnetic moment) relaxed by electronic spins is surrounded by a coil of a pick-up circuit capable of picking up the nuclear resonance energy emission and having a Q factor superior to a certain value which depends on the geometrical characteristics of the coil, said pick-up circuit delivers electromagnetic energy at the nuclear resonance frequency $F_N$ which is given by the formula $$F_N = \gamma_N \frac{H}{2\pi}$$

According to the invention, the exploratory sample placed in the field to be measured is constituted by a certain quantity of a liquid containing the nuclei (for example protons), the nuclear resonance of which is to be observed, added with a small quantity of dissolved paramagnetic impurities, preferably of the above-mentioned special type.

A device according to the invention comprises therefore means for maintaining in the magnetic field to be measured a container for a liquid containing, on the one hand, nuclei having non-zero angular momentum and magnetic moment, on the other hand dissolved in said liquid, a paramagnetic substance and emitting, when one of its electronic resonance bands is saturated, energy at the frequency of the nuclear resonance line of said nuclei, means for saturating one of the electronic resonance bands of said paramagnetic substance, means for picking-up the emitted energy and means for measuring the frequency of the picked-up energy.

When the magnetic field to be measured is weak or very weak (for example when measuring the earth's magnetic field), it is essential, in order to increase the sensibility of such frequency self-generator, to constitute the impurities by a paramagnetic substance possessing an electric resonance line having a hyperfine structure of the above-mentioned special type, i.e. a substance as a nitrosodisulfonate, diphenyl-picryl-hydrazil, etc.

Of course, the quantity of the dissolved impurity is not at all critical.

In the particular case when the pick-up coil receiving the energy at frequency $F_N$ should possess a very high Q (e.g. above 300), it is possible to provide means for increasing artificially said Q, for example either by feedback or by using two coils in the low frequency detection circuit, one coil receiving the proton signal and the other coil, disposed at a distance from the first coil, having a very high Q, e.g. due to the presence of a ferrite core.

The invention will be now described in fuller detail with reference to the appended drawings representing characteristic curves interesting the phenomena involved in the process and apparatus according to the invention and three preferred embodiments of an apparatus according to the invention given only for purposes of illustration.

Referring to the drawings, FIGS. 1 and 2 represent, in full lines, respectively the electronic resonance frequencies $F_s$ in MHz. and the energy levels E (the difference of the energies for a zero magnetic field being taken as a unit) for the nitrosodisulfonate spins plotted against the magnitudes of the magnetic field (in gauss) wherein said spins are placed.

Figure 3:
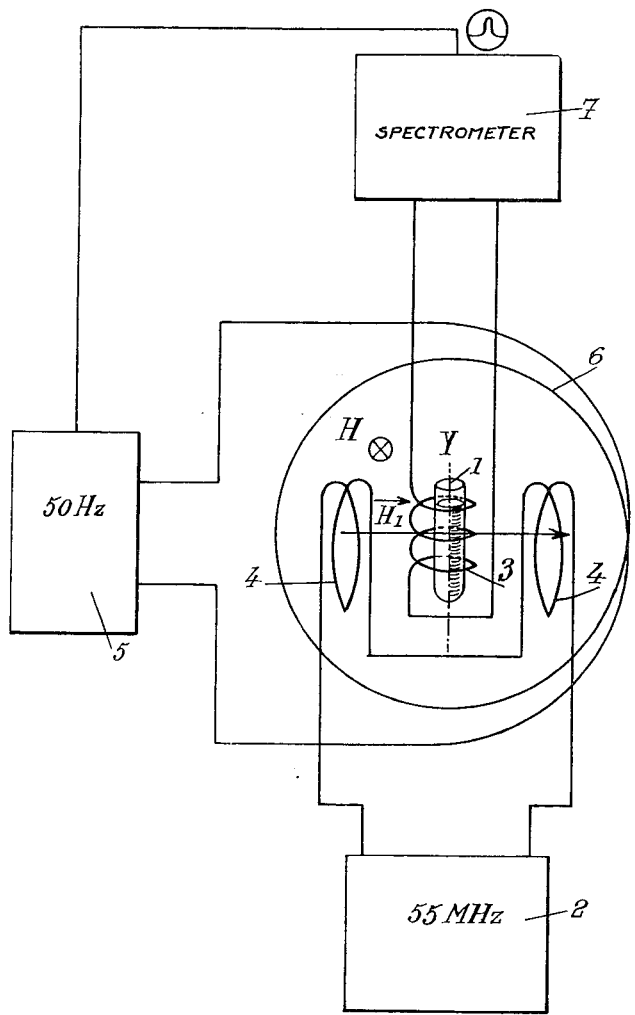
FIG. 3 shows diagrammatically an embodiment of an apparatus according to the invention with a field sweep, said apparatus embodying the process according to the invention.

Contrarily to the nuclear resonance lines (represented e.g. by straight line P corresponding to protons) and to the electronic resonance bands of metals and paramagnetic substances with mobile resonance electron or electrons (represented by straight lines E—when $\alpha=1$, i.e. for the highest slope, and E'—when $\alpha=\frac{1}{2}$ for a dipole-dipole interaction with complete saturation), the resonance lines bands of paramagnetic substances having a stationary hyperfine structure correspond to curves $S_1$ to $S_8$, obtained from curves $Ea$ to $Eg$ of FIG. 2 which represents the diagram of the energy levels plotted against magnetic fields in the case of such hyperfine structure, for example in the case of nitrosodisulfonate.

It is known that an atomic nucleus having a spin quantum number I enjoys, in a magnetic field as $$\vec{H}$$

$2I+1$ values for its measurable components. In the case of a hyperfine structure of a paramagnetic ion, due to the coupling of an electronic spin I' with a nuclear spin I, there are therefore $(2I'+1)(2I+1)$ energy levels. As $I'=\frac{1}{2}$ for the electron and $I=1$ for the nitrosodisulfonate ion, such ion enjoys $2 \times 3 = 6$ energy levels (curves $Ea$ to $Eg$).

It is possible to derive from curves $Ea$ to $Eg$, which may be determined by calculation, curves $S_1$ to $S_8$ by utilizing the afore-mentioned formula $\Delta E=hf_1$ which shows that the curves $S_1$ to $S_8$ may be obtained by determining the differences between the ordinates of curves $Ea$ to $Eg$ taken 2 by 2 and by choosing appropriate ordinates. If one considers FIG. 2, it is easy to see that curves $Eb$ and $Ec$ correspond to curves $Ef$ and $Eg$ respectively by a symmetry relatively to the X axis; therefore the curves $S_6$ to $S_8$ derive from the differences between curves $Ea$ to $Ed$, taking of course into consideration only the allowed transitions, whereas curves $S_1$ to $S_5$ result from the differences between a curve from group $Ea$ to $Ed$ and a curve from group $Ef$, $Eg$, account being taken of the above-mentioned symmetry, on the one hand, and of only the allowed transitions, on the other hand.

It is therefore the difference DE (taken as ordinate unit on FIG. 2) of the energies in a zero magnetic field between the curves of group $Ea$ to $Ed$ and the curves of group $Ef$, $Eg$ (resulting from the stationary hyperfine structure of the added paramagnetic substance) which motivates and causes the existence of a resonance frequency $F_s$ having a non-zero limit $F'_E$ in a zero magnetic field; this fact allows a considerable increase, particularly in very weak magnetic fields, as the earth's field, of the resonance signal amplitude and consequently of the measurement precision.

In fact, for a very weak field, the electronic resonance frequency $F_s$ which is substantially equal to $F'_E$ of a line of the type $S_1$ to $S_5$ (and in particular of line $S_1$) is much greater than (7) $$F_E = \gamma_E \frac{H}{2\pi}$$

($\gamma_E$ being the value of the electron gyromagnetic ratio).

If one of the lines having a frequency $F_s$ in the vicinity of $F_E$ is saturated, the increase of the nuclear resonance signal becomes:

(8) $$\rho' = \alpha \frac{F_s}{F_N}$$

instead of the preceding value:

$$\rho = \alpha \frac{F_E}{F_N}$$

(Formula 5)

therefore $\rho' \gg \rho$ because $F_s \cong F'_E \gg F_E$.

For example, for a nitrosodisulfonate aqueous solution disposed in the earth's magnetic field (0.5 gauss), $F'_E = 1.4$ MHz., $F'_E = 55$ MHz. and the nuclear resonance signal is increased roughly in the ratio:

$$\frac{F'_E}{F_E} = \frac{55}{1.4} = 39.2$$

Referring now to the diagrammatic FIG. 3, we will describe a non-limitative example of embodiment of our method and apparatus for measuring weak or very weak magnetic fields with a paramagnetic substance having a stationary hyperfine structure, utilizing a field sweep.

In such embodiment, the device is placed in the field to be measured, which is the earth's field H, and is perpendicular to the plane of the drawing, and the sample jar 1 used for the measure is a milli-molecular solution of potassium nitrosodisulfonate in 20 ml. of pure water containing a potassium carbonate concentration of M/20 (M corresponding to the normal molecular concentration of 1 mole per liter). Oscillator 2, giving an output of 10 watts, oscillates at a frequency $F_s$ of 55 MHz., adjustable at ±2 MHz., which is the resonance frequency $F'_E$ in a zero magnetic field of the nitrosodisulfonate ion.

Oscillator 2 allows the saturation of one of the electronic resonance bands or lines, for example line $S_1$, of the disulfonate ion by creating through coils 4, a magnetic field $$\vec{H_1}$$

at the frequency of 55 mHz. perpendicular to field $$\vec{H}$$

A low frequency oscillator 5 (e.g. a 50 Hz. oscillator) modulates or sweeps said field $$\vec{H}$$

by means of coil 6 with an alternating amplitude of e.g. 2 milligausses and permits the production of the resonance which is detected by means of a pick-up coil 3 having the axis Y thereof perpendicular to $$\vec{H}$$

the axis Y being also, although not necessarily perpendicular to $$\vec{H_1}$$

The resonance takes place when $$F_N = \gamma_P \frac{H+h'}{2\pi}$$

wherein $F_N$ is the nuclear resonance frequency in coil 3, $\gamma_P$ the proton gyromagnetic ratio and $h'$ the amplitude of the modulation of field $$\vec{H}$$

at the resonance.

The resonance at the nuclear frequency is detected e.g. by the conventional absorption technique, wherein the resonance effects are detected by their reaction on the circuit supplying the nuclear frequency coil 3. At the resonance, a maximum absorption occurs because the atomic nuclei absorb a maximum quantity of electromagnetic radiation energy at this resonance frequency in their transition between two energy levels according to formula $\Delta E = hf_1$ given in the preamble immediately after Formula 1a. This absorption technique can advantageously make use of a spectrograph 7, e.g. of the type realized by Pound and Knight (Rev. of Sci. Instr. 21, 1950 pp. 219–225), modified for its use at very low frequencies (2,100 Hz., resonance frequency of the proton in the earth's field H being measured): the modification consists essentially in the substitution of a high impedance (1–2 MΩ) entrance circuit (necessary for this very low frequency) to the conventional low impedance (of a few KΩ) necessary for the higher frequencies (above 1 mHz.).

The frequency, at the resonance determined by spectrograph 7, is measured with a great precision by counting with means not shown, the number of oscillations occurring during a period of e.g. 100 seconds and this frequency enables to determine the value of field H from the above-mentioned formula.

It is of course possible to use other means for determining the resonant condition, from example a cathode ray oscilloscope having its horizontal deflection governed by $H+h'$ and its vertical deflection governed by the resonance signal.

Figure 4:
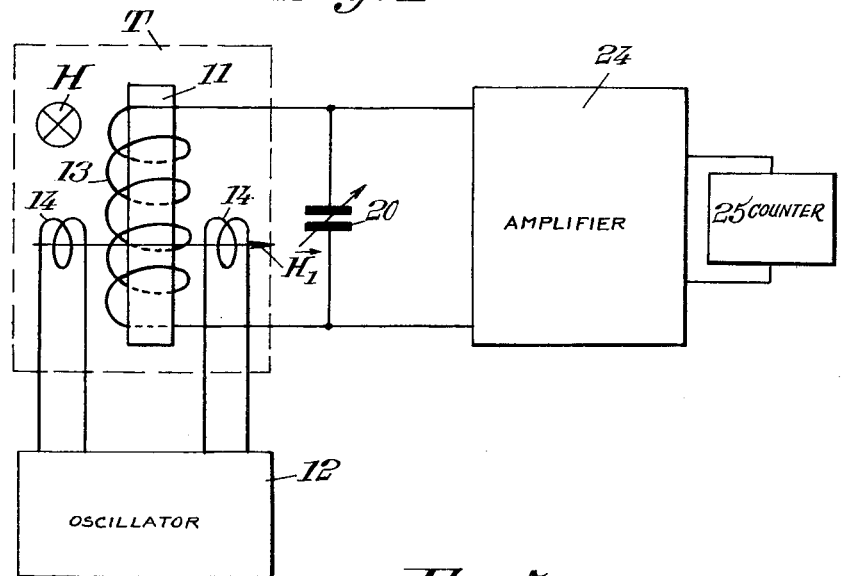
FIGS. 4 and 5 represent, the first one schematically and the second one with more details, two embodiments of an apparatus according to the invention enabling the accurate measurement of magnetic fields, without any frequency or field sweep.
Figure 5:
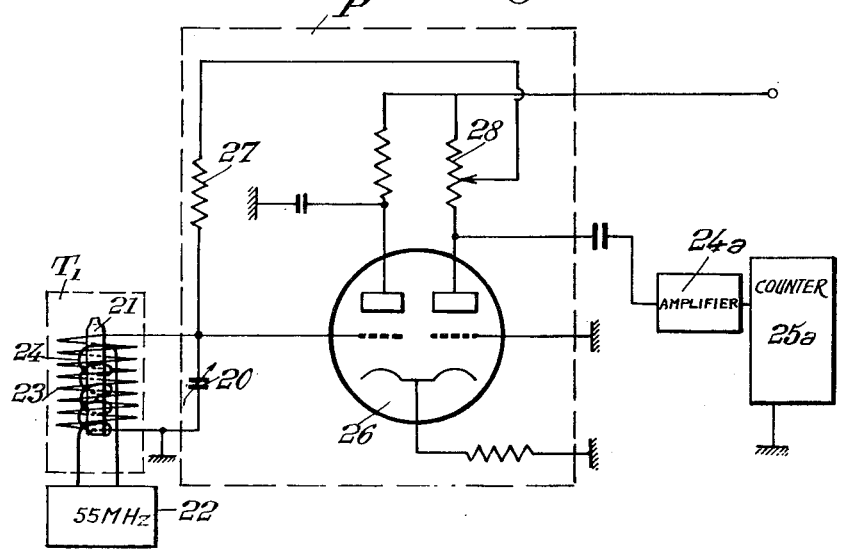

Two forms of a device, according to the preferred embodiments of the invention (i.e. without sweep), which are particularly convenient for measuring weak or very weak magnetic fields, e.g. the earth's magnetic field for prospecting purposes, are represented on FIGS. 4 and 5.

In the embodiment shown schematically on FIG. 4, a test jar 11, containing a sample of 20 ml. of water with dissolved paramagnetic impurities (of the stationary hyperfine structure type) is placed in a high frequency field $$\vec{H_1}$$

perpendicular to field $$\vec{H}$$

to be measured, said field $$\vec{H_1}$$

being produced by the coils 14 receiving the output of oscillator 12 in order to saturate one of the electronic resonance bands of the paramagnetic impurities.

Due to the breadth of the electronic bands, said oscillator 12 need not satisfy very critical stability conditions either in frequency (±1%) or in amplitude (±50%). As said oscillator may be of any known type, it is not described but represented only in block form in FIG. 4.

It is further to be considered that when a paramagnetic substance having a hyperfine structure, of the type represented in full lines on FIG. 1 is used, the frequency $F_s$ of said generator is practically independent of the frequency of field H to be measured for weak fields (for example inferior to 2 gausses) and equal to $F'_E$ (55 MHz. when using nitrodisulfonate ions as paramagnetic substance).

Test jar 11 is placed inside a pick-up coil 13 of a resonant circuit tuned approximately (by means of an adjustable capacitor 20) on the nuclear resonance frequency of the proton in the field H being measured (2,100 MHz. in the earth's magnetic field) and having a sufficiently high Q. The alternating frequency obtained in said resonant circuit is amplified by an amplifier 24 (e.g. of conventional construction and therefore represented in block form in FIG. 4), said amplifier 24 delivering in a frequency counter 25 an alternating voltage having a frequency F exactly proportional to the magnitude H of the magnetic field wherein the test jar 11 is disposed, as $$F = \gamma_P \frac{H}{2\pi}$$

The frequency F is measured in counter 25 by any known means, for example by direct counting of the periods during a given time by means of any suitable counter of known type, e.g. as disclosed in U.S. patent to R. H. Varian No. Re. 23,769, issued January 12, 1954 (counter 11 of FIG. 1), or as defined hereinafter with reference to FIG. 5; ratio $\gamma$ being known with great accuracy, the field H is calculated from Formula 1.

As it is not always easy to obtain the high Q necessary for sustaining the oscillations resulting from the stimulated emission of radiation of energy (emitted by said sample as indicated hereinabove, the value of Q must be superior to a value $Q_0$ which depends upon the sample and the head T used ($Q_0$ being easily determined experimentally in each case by observing the advent of sustained oscillations of frequency F) and which may in some cases be equal or superior to 300, it is possible to increase artificially Q e.g. by providing a positive feed-back loop as represented on FIG. 5, which gives a practical example of a head, a tuned circuit and a feed-back amplifier, which may be utilized for measuring the earth's magnetic field.

The head $T_1$ of the FIG. 5 includes two concentrical coils, i.e.:

A high frequency polarization coil 24 (energized by oscillator 22 similar to oscillator 12, delivering for example a frequency of 55 MHz.±2 MHz.) which saturates the electronic resonance band of the paramagnetic substance (nitrosodisulfonate) of the sample placed in a container or jar 21, and A low frequency pick-up coil 23 tuned on 2100 Hz., resonance frequency of the protons in the earth's magnetic field, by variable condenser 20 which is an integral part of the preamplifier P including essentially a positive feed-back circuit.

This circuit comprises a double-triode tube 26 (of the type 12AT7) connected as a conventional amplifier with an earthed grid, and the feed-back is obtained by resistor 27 having a value of 5MΩ. The feed-back ratio is easily adjusted by a potentiometer 28, having a maximum resistance of 100KΩ in this particular example. The resulting voltage, amplified in amplifier 24a, is available at 25a.

The measurement of the frequencies of the oscillations may be realized in a counter 25a, for example by means of a system of decades or scale-of-ten circuits (e.g. of the type used for counting the current pulses in nucleonic instrumentation) which allows to count, with a precision within about 1 microsecond, of e.g. 100, 1,000 or 10,000 periods of the Larmor frequency of the protons in the earth's field or a like weak field, thereby permitting a relative precision of about $2.10^{-5}$, $2.10^{-6}$ or $2.10^{-7}$ respectively.

It is therefore possible to provide, according to the invention, a device allowing the measurement of even very weak magnetic fields and in particular of the earth's magnetic field, said device being very light in weight and very easy to operate by non-technical personnel because it comprises only a conventional oscillator 22 without important stability requirements, a small and light head T, or $T_1$, a preamplifier P (including essentially only one electron tube 26 and a potentiometer 28), a conventional amplified 24a and a decade counter connected at 25a.

Such an easily transportable and rugged device allowing relative measures with a precision of about $10^{-6}$ of weak magnetic fields, and in particular of the earth's field, is particularly well adapted for geophysical prospecting based on the detection of the anomalies of earth's magnetic field.

Since certain modifications may be made in the method and device of the present invention without departing from the scope thereof, it is intended that all matter contained in the foregoing description and shown in the accompanying drawings be interpreted merely as illustrative and not in a limiting sense.

What we claim is:

1. Method of precisely measuring the intensity of weak magnetic fields comprising the steps of: locating in the weak magnetic field to be measured a quantity of a solution consisting of a solvent containing atomic nuclei having non-zero angular momentum and magnetic moment, and therefore capable of exchanging energy with electromagnetic radiations at a nuclear resonance frequency proportional to the intensity of the magnetic field in which they are located, and of a paramagnetic free radical of stationary hyperfine structure dissolved and ionized in said solvent, said free radical having in a varying weak magnetic field at least one electronic resonance frequency band around a central frequency which has a non-zero limit when said varying magnetic field approaches zero; applying to said quantity of solution an alternating magnectic field at a frequency comprised in the electronic frequency band for said free radical in said weak magnetic field to be measured and capable of substantially saturating said electronic resonance band, thereby materially enhancing the capacity of exchanging energy at the nuclear resonance frequency of said atomic nuclei in said weak magnetic field to be measured; producing an exchange of energy between said atomic nuclei and an electromagnetic radiations system at said nuclear resonance frequency; and precisely determining the frequency of the energy exchanged by said atomic nuclei in said weak magnetic field to be measured.

2. Method as claimed in claim 1, wherein said atomic nuclei having non-zero angular momentum and magnetic moment are protons.

3. Method of precisely measuring the intensity of the earth magnetic field in a given location comprising the steps of: locating in the earth magnetic field to be measured a quantity of a solution consisting of a solvent containing atomic nuclei having non-zero angular momentum and magnectic moment, and therefore capable of absorbing energy from electromagnetic radiations at a nuclear resonance frequency proportional to the intensity of the magnetic field in which they are located, and of a paramagnetic free radical or stationary hyperfine structure dissolved and ionized in said solvent, said free radical having in a varying weak magnetic field at least one electronic resonance frequency band around a central frequency which has a non-zero limit when said varying magnetic field approaches zero; applying to said quantity of solution a magnetic field at a frequency comprised in the electronic frequency band for said free radical in the earth magnetic field and capable of substantially saturating said electronic resonance band, thereby materially enhancing the capacity of absorbing energy at the nuclear resonance frequency of said atomic nuclei in the earth magnetic field to be measured; producing inside said solution electromagnetic radiations at said nuclear resonance frequency; and precisely determining the frequency of the energy absorbed from said electromagnetic radiations by said atomic nuclei in the earth magnetic field in said location.

4. Method as claimed in claim 3, wherein said solution is constituted by an aqueous solution of a nitrosodisulfonate ion.

5. Method as claimed in claim 3, wherein said solution is constituted by diphenyl-picryl-hydrazyl ions dissolved in an organic solvent.

6. Method as claimed in claim 3, wherein said solution is constituted by tetraphenylstibonium nitrosodisulfonate ions dissolved in ether.

7. Method as claimed in claim 3, wherein said solution is constituted by picryl-aminocarbozyl ions dissolved in benzene.

8. Method as claimed in claim 3, wherein said solution is constituted by semiquinone ions dissolved in water.

9. Apparatus for precisely measuring the intensity of weak magnetic fields comprising in combination: a container enclosing a quantity of a solution consisting of a solvent containing atomic nuclei having non-zero angular momentum and magnetic moment, and therefore capable of exchanging energy with electromagnetic radiations at a nuclear resonance frequency proportional to the intensity of the magnetic field in which they are located, and of a paramagnetic free radical of stationary hyperfine structure dissolved and ionized in said solvent, said free radical having in a varying weak magnetic field at least one electronic resonance frequency band around a central frequency which has a non-zero limit when said varying magnetic field approaches zero; means arranged in operative relation with said container for applying inside said container to said quantity of solution an alternating magnetic field at a frequency comprised in the electronic frequency band for said free radical in said weak magnetic field to be measured and capable of substantially saturating said electronic resonance band, thereby materially enhancing the capacity of exchanging energy at the nuclear frequency of said atomic nuclei in said magnetic field to be measured; electromagnetic radiations transducing means for exchanging energy with said atomic nuclei at said nuclear resonance frequency; and means for precisely determining the frequency of said last mentioned energy exchanged with said atomic nuclei in said weak magnetic field to be measured.

10. Apparatus as claimed in claim 9, wherein said atomic nuclei having non-zero angular momentum and magnetic moment are protons.

11. Apparatus for precisely measuring the intensity of the earth magnetic field in a given location comprising in combination: a container enclosing a quantity of a solution consisting of a solvent containing atomic nuclei havig non-zero angular momentum and magnetic moment, and therefore capable of absorbing energy from electromagnetic radiations at a nuclear resonance frequency proportional to the intensity of the magnetic field in which they are located and of a paramagnetic free radical of stationary hyperfine structure dissolved and ionized in said solvent, said free radical having in a varying weak magnetic field at least one electronic resonance frequency band around a central frequency which has a non-zero limit when said varying magnetic field approaches zero; means arranged in operative relation with said container for applying to said quantity of solution an alternating magnetic field at a frequency comprised in the electronic frequency band for said free radical in the earth magnetic field and capable of substantially saturating said electronic resonance band, thereby materially enhancing the capacity of absorbing energy at the nuclear resonance frequency of said atomic nuclei in the earth magnetic field; means for producing inside said container electromagnetic radiations at said nuclear resonance frequency; and means for precisely determining the frequency of the energy absorbed from said electromagnetic radiations by said atomic nuclei in the earth magnetic field.

12. Apparatus as claimed in claim 11, wherein said solution is constituted by an aqueous solution of a nitrosodisulfonate of an alkali metal taken from the group consisting of sodium and potassium.

13. Apparatus as claimed in claim 11, wherein said solution is constituted by diphenyl-picryl-hydrazyl ions dissolved in benzene.

14. Method of precisely measuring the intensity of weak magnetic fields comprising the steps of: locating in the magnetic field to be measured a quantity of a solution consisting of a solvent containing atomic nuclei having non-zero angular momentum and magnetic moment, and therefore a nuclear resonance frequency proportional to the intensity of the magnetic field in which they are located, and of a paramagnetic free radical dissolved and ionized in said solvent, said free radical having in a varying weak magnetic field at least one electronic resonance frequency band around a central frequency which has a non-zero limit when said varying magnetic field approaches zero; the saturation of said band by an alternating magnetic field at a frequency comprised in said band producing a stimulated emission of energy by said nuclei at said nuclear resonance frequency in which they are placed; applying to said quantity of matter an alternating magnetic field at a frequency comprised in the electronic frequency band for said free radical in said weak magnetic field to be measured and capable of substantially saturating said electronic resonance band, thereby producing a stimulated emission of energy at the nuclear resonance frequency of said atomic nuclei in said weak magnetic field to be measured; collecting said energy produced by stimulated emission; and precisely determining the frequency of the collected energy.

15. Method as claimed in claim 14, wherein said solution is constituted by an aqueous solution of nitrosodisulfonate ions.

16. Apparatus for measuring the intensity of a weak magnetic field comprising in combination: a container to be placed in said field; in this container a solution consisting of a solvent containing atomic nuclei having an angular momentum and a magnetic moment both known and different from zero and of a paramagnetic substance having a hyperfine structure of the stationary type with a non-zero splitting in said magnetic field and with at least one electronic resonance line, in said field, saturable by a radiofrequency magnetic field, such saturation producing a stimulated emission of energy by said nuclei at a frequency proportional to the intensity of the magnetic field in which they are placed, and said substance being dissolved in said solvent; means for applying to said solution in said container an alternating magnetic field, to saturate said line; means for picking-up the energy emitted by said nuclei of said solution in response to the saturation of said line in said weak magnetic field; and means for determining the frequency of said picked-up energy.

17. Apparatus as claimed in claim 16, wherein said means for applying an alternating magnetic field comprise an oscillator operating at a frequency substantially equal to said electronic resonance line and at least one transmitting coil fed by said oscillator and located relatively to said container to create an alternating magnetic field at said frequency inside said container.

18. Apparatus as claimed in claim 16, wherein said means for picking-up the energy comprises a pick-up coil located around said container with the axis thereof substantially perpendicular to said weak magnetic field and circuit elements connected to said pick-up coil to form a high Q resonant circuit tunable at the frequency of said energy produced by stimulated emission in said weak magnetic field.

19. Apparatus as claimed in claim 18, wherein said circuit elements include a further coil connected in series with said pick-up coil, said further coil being located at a distance from said pick-up coil and having a very high Q factor.

20. Apparatus as claimed in claim 18, wherein said circuit elements include a positive feed-back loop, materially increasing the Q factor of said resonant circuit and means for adjusting the feed-back ratio in said loop.

21. Apparatus for very accurately measuring the intensity of the earth magnetic field in a given location comprising in combination: a container enclosing a solution in water of nitrosodisulfonate ions; a first coil surrounding said container; an oscillator operating at a frequency of about 55 megacycles per second and having an output operatively connected to said first coil for delivering therein an A.C. voltage at said frequency of sufficient amplitude to produce an alternating magnetic field inside said container for saturating an electronic resonance line of said nitrosodisulfonate ions at 55 megacycles per second; a second coil surrounding said container for picking-up the energy generated by the protons of said water in said container in response to the saturation of said electronic resonance line of said nitrosodisulfonate ions dissolved therein, said energy being at a frequency in cycles per second equal to substantially $26{,}752/2\pi$ times the intensity in gauss of the magnetic field in which is maintained said container; an adjustable capacitor connected to said second coil to form a resonant circuit tunable at frequencies in the vicinity of 2,100 cycles per second; circuit means connected to said resonant circuit for imparting to said circuit a Q factor sustaining in said resonant circuit oscillations of the picked-up energy; and means for very accurately determining the frequency of said sustained oscillations.

22. Apparatus as claimed in claim 21, wherein said means for very accurately determining the frequency of said sustained oscillations are constituted by a decade counter counting the number of said oscillations occurring during a predetermined time interval.

References Cited in the file of this patent

UNITED STATES PATENTS

| Re. 23,769 | Varian | Jan. 12, 1954 |

FOREIGN PATENTS

| 204,251 | Australia | Nov. 1, 1956 |
| 1,136,361 | France | Dec. 29, 1956 |
| 1,141,373 | France | Mar. 18, 1957 |
| 789,100 | Great Britain | Jan. 15, 1958 |

(Other references on following page)

OTHER REFERENCES

Pound: Physical Review, vol. 79, No. 4, Aug. 15, 1950; pp. 685 to 702 (with pages 700 and 701 principally relied upon).

Feher: Physical Review; vol. 103, No. 2, July 1956, pp. 500 and 501.

Beljers et al.: Physical Review, vol. 95, No. 6, Sept. 15, 1954, page 1683.

Burgess et al.: Physical Review, vol. 100, No. 2, October 1955, pp. 752 and 753.

Hopkins: Review of Scientific Instruments, vol. 20, No. 6, June 1949, pp. 401–402.

Slichter et al.: Physical Review, vol. 102, No. 4, pp. 975–980, May 15, 1956.

Andrew: Nuclear Magnetic Resonance, Text published by The Cambridge University Press, 1955, pp. 51 and 52 relied on.